US008108446B1

(12) United States Patent
Christiaens (10) Patent No.: US 8,108,446 B1
(45) Date of Patent: Jan. 31, 2012

(54) METHODS AND SYSTEMS FOR MANAGING DEDUPLICATED DATA USING UNILATERAL REFERENCING

(75) Inventor: Mark Christiaens, Aalter (BE)

(73) Assignee: Symantec Corporation, Mountain View, CA (US)

( * ) Notice: Subject to any disclaimer, the term of this patent is extended or adjusted under 35 U.S.C. 154(b) by 479 days.

(21) Appl. No.: 12/147,849

(22) Filed: Jun. 27, 2008

(51) Int. Cl.
*G06F 12/00* (2006.01)

(52) U.S. Cl. ........................................ 707/816; 707/693

(58) Field of Classification Search ........... 707/999.101, 707/693, 816
See application file for complete search history.

(56) References Cited

U.S. PATENT DOCUMENTS

| | | | | |
|---|---|---|---|---|
| 5,990,810 | A * | 11/1999 | Williams | 341/51 |
| 7,451,168 | B1 * | 11/2008 | Patterson | 1/1 |
| 7,840,955 | B1 * | 11/2010 | Weathersby et al. | 717/168 |
| 2004/0078381 | A1 * | 4/2004 | Blandy et al. | 707/101 |
| 2004/0107225 | A1 * | 6/2004 | Rudoff | 707/204 |
| 2005/0071436 | A1 * | 3/2005 | Hsu et al. | 709/212 |
| 2005/0080823 | A1 * | 4/2005 | Collins | 707/200 |
| 2005/0131939 | A1 * | 6/2005 | Douglis et al. | 707/103 Y |
| 2005/0132374 | A1 * | 6/2005 | Flood et al. | 718/100 |
| 2006/0059171 | A1 * | 3/2006 | Borthakur et al. | 707/100 |
| 2006/0116990 | A1 * | 6/2006 | Margolus et al. | 707/3 |
| 2006/0173939 | A1 * | 8/2006 | Yin et al. | 707/206 |
| 2007/0033375 | A1 * | 2/2007 | Sinclair et al. | 711/203 |
| 2007/0100913 | A1 * | 5/2007 | Sumner et al. | 707/204 |
| 2007/0124415 | A1 * | 5/2007 | Lev-Ran et al. | 709/217 |
| 2008/0005141 | A1 * | 1/2008 | Zheng et al. | 707/101 |
| 2008/0154928 | A1 * | 6/2008 | Bashyam et al. | 707/101 |
| 2008/0172430 | A1 * | 7/2008 | Thorstensen | 707/206 |
| 2008/0263109 | A1 * | 10/2008 | Patterson | 707/204 |
| 2008/0270436 | A1 * | 10/2008 | Fineberg et al. | 707/101 |
| 2008/0281908 | A1 * | 11/2008 | McCanne et al. | 709/203 |
| 2009/0177855 | A1 * | 7/2009 | Drews et al. | 711/162 |
| 2009/0210640 | A1 * | 8/2009 | Davis | 711/162 |
| 2009/0234892 | A1 * | 9/2009 | Anglin et al. | 707/201 |
| 2009/0259701 | A1 * | 10/2009 | Wideman et al. | 707/206 |
| 2009/0265399 | A1 * | 10/2009 | Cannon et al. | 707/205 |
| 2009/0287901 | A1 * | 11/2009 | Abali et al. | 711/206 |
| 2009/0319585 | A1 * | 12/2009 | Gokhale | 707/205 |
| 2009/0327625 | A1 * | 12/2009 | Jaquette et al. | 711/160 |

OTHER PUBLICATIONS

Zhu et al., "Avoiding the Disk Bottleneck in the Data Domain Deduplication File System," Fast '08: 6th USENIX Conference on File and Storage Technologies, 2008, pp. 269-282.
Zhang, Xianbo; U.S. Appl. No. 13/007,301; filed on Jan. 14, 2011.

* cited by examiner

*Primary Examiner* — Hung T Vy
*Assistant Examiner* — Phuong Thao Cao
(74) *Attorney, Agent, or Firm* — Advantedge Law Group (57) ABSTRACT

A computer-implemented method for managing deduplicated data using unilateral referencing may comprise: 1) identifying each file in the deduplicated data system, 2) identifying each data segment in the deduplicated data system that is referenced by at least one file in the deduplicated data system, and then 3) creating an active-data-segments set that identifies or references each data segment that is referenced by at least one file in the system. Data segments in the system that are not identified or referenced in the active-data-segments set may be removed. Corresponding systems and methods are also disclosed.

13 Claims, 8 Drawing Sheets

METHODS AND SYSTEMS FOR MANAGING DEDUPLICATED DATA USING UNILATERAL REFERENCING

BACKGROUND

Deduplicated data systems are often able to reduce the amount of space required to store files by recognizing redundant data patterns. For example, a deduplicated data system may reduce the amount of space required to store similar files by: 1) dividing each of the files into a plurality of data segments, 2) identifying redundant (i.e., identical) data segments from within the plurality of data segments, and then 3) storing only those data segments that are unique (i.e., non-redundant). In this example, each file within the deduplicated data system may then simply consist of a list of data segments that compose or make up the file, as opposed to containing the actual contents of the file.

While conventional deduplicated data systems may reduce the space required to store files, the mechanisms used by such conventional systems to manage deduplicated data may present unwanted limitations. For example, in order to ensure that data segments are not prematurely removed, conventional deduplicated data systems typically use "bilateral" referencing systems. For example, each file in a conventional deduplicated data system typically maintains a list of data segments that compose or make up the file. Likewise, each data segment within the deduplicated data system typically maintains a list that identifies each file within the system that references the data segment. The deduplicated data system may use each list (i.e., the lists maintained by both the files and the data segments) to identify inactive data segments (i.e., data segments that are no longer referenced by any of the files in the deduplicated data system) that may be removed from the system.

Unfortunately, the bilateral referencing systems used by many conventional deduplicated data systems suffer from a number of deficiencies. For example, when a file in a conventional deduplicated data system is updated, the system typically must update both the referential list maintained by the file and the referential list maintained by each data segment referenced by the file. The process of creating and updating two referential lists may be both time consuming and resource intensive. As such, deduplicated data systems may benefit from a more efficient mechanism for referencing and managing deduplicated data.

SUMMARY

The instant disclosure relates generally to systems and methods for managing deduplicated data using unilateral referencing. In particular, and as will be described in greater detail below, the systems and methods disclosed herein may manage deduplicated data using a "mark and sweep" approach that may eliminate the need for inefficient and complex bilateral referencing systems.

For example, a method for identifying active data segments in a deduplicated data system (i.e., data segments that are currently referenced by files in the deduplicated data system) may comprise: 1) identifying each file in the deduplicated data system, 2) identifying each data segment in the deduplicated data system that is referenced by at least one of the files in the deduplicated data system, and then 3) creating an active-data-segments set that identifies or references each data segment that is referenced by at least one of the files in the system. As will be described in greater detail below, this exemplary method (also referred to herein as a "mark" phase) may prevent active data segments from being prematurely (and erroneously) removed from the deduplicated data system.

In one example, each file may comprise a file-segment list that identifies or references each data segment that composes or makes up the file. This file-segment list may also contain a unique identifier that uniquely identifies each data segment that composes or makes up the file. Examples of unique identifiers include, without limitation, pointers, metadata, hash values, checksums (such as MD5 sums), digital fingerprints, or any other form of identifier.

In some examples, the active-data-segments set may be created by adding each data segment in the deduplicated data system that is referenced by at least one file in the deduplicated data system to the active-data-segments set. In an additional example, the active-data-segments set may be created by: 1) identifying each unique identifier contained in each file-segment list for each file in the deduplicated data system, 2) comparing each unique identifier contained in each file-segment list with the active-data-segments set, 3) determining whether each file-segment list contains any unique identifiers that are not contained in the active-data-segments list, and then 4) adding any unique identifiers that are not contained in the active-data-segments set to the active-data-segments set.

The active-data-segments set may identify or reference active data segments in a variety of ways. For example, the active-data-segments set may represent a linked list, a sorted linked list, a balanced tree, a bloom filter, and/or any other suitable data structure for identifying or referencing data. In one or more of these examples, the active-data segments set may, in addition to identifying each data segment that is referenced by at least one of the files in the system, identify additional data segments that are not referenced by at least one file in the deduplicated data system. The active-data segments set may also identify the same data segment more than once. In addition, the method may further comprise sorting the active-data-segments set in order to enable a computing system to more efficiently and quickly access and/or modify the active-data-segments set and/or the data segments referenced by the active-data-segments set.

In some examples, the method may further comprise: 1) identifying a new file added to the deduplicated data system prior to completion of a mark phase or cycle, 2) dividing the new file into data segments, and 3) automatically adding the data segments for the new file to the active-data-segments list in order to ensure that the new file (or data segments associated with the new file) is not prematurely removed from the deduplicated data system.

In some embodiments, the method may iterate over less than the entirety of files stored in a deduplicated data system. In this example, the method may comprise: 1) identifying a subset of files in the deduplicated data system that is statistically likely to contain changes, 2) identifying each data segment in the deduplicated data system that is referenced by at least one of the files in the subset of files, and then 3) causing the active-data-segments to identify each data segment in the deduplicated data system that is referenced by at least one of the files in subset of files. Such an approach may result in a more efficient mark phase at the cost of a potential reduction in accuracy of the mark phase.

The systems and methods described herein may also enable efficient removal of inactive data segments (i.e., data segments that are not referenced by any of the files in a deduplicated data system). For example, a method for removing inactive data segments from a deduplicated data system (also referred to herein as a "sweep" phase) may comprise: 1) identifying each data segment in the deduplicated data system, 2) identifying an active-data-segments set that identifies each data segment in the deduplicated data system that is referenced by at least one file in the deduplicated data system, 3) identifying at least one data segment in the deduplicated data system that is not identified in the active-data-segments set, and then 4) removing, from the deduplicated data system, the data segment that is not identified in the active-data-segments set.

In some embodiments, the active-data-segments set may contain each data segment in the deduplicated data system that is referenced by at least one file in the deduplicated data system. In an alternative embodiment, the active-data-segments set may contain a unique identifier for each data segment in the deduplicated data system that is referenced by at least one file in the deduplicated data system.

In one example, the method may also comprise: 1) identifying a new file added to the deduplicated data system prior to completion of a cycle for removing inactive data segments, 2) dividing the new file into data segments, 3) marking each of the data segments for the new file as new, and then 4) storing each of the data segments for the new file in the deduplicated data system. Marking the data segments for the new files in this manner many ensure that the new file (or data segments associated with the new file) is not prematurely removed from the deduplicated data system.

Methods and systems for deduplicating data using unilaterally referencing are also disclosed. For example, a method for deduplicating data may comprise: 1) identifying a file for deduplication, 2) identifying contents of the file, 3) determining, by comparing the contents of the file with each data segment in a deduplicated data system, that at least a portion of the contents of the file is different from each data segment in the deduplicated data system, 4) storing the contents of the file that are different from each data segment in the deduplicated data system as at least one new data segment, and then 5) referencing the new data segment in an active-data-segments set.

In one example, the system may divide the contents of the file into data segments. In this example, the method may comprise: 1) comparing each data segment of the file with each data segment in the deduplicated data system and 2) determining that at least one data segment of the file is different from each data segment in the deduplicated data system.

In certain examples, the method may also comprise: 1) creating a unique identifier for each data segment of the file and 2) storing the unique identifier for each data segment of the file in a file-segment list associated with the file. The new data segment may be referenced in the active-data-segments set by storing each data segment of the file in the active-data-segments set or by storing the unique identifier for each data segment of the file in the active-data-segments set.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to systems and methods for managing deduplicated data using unilateral referencing. In particular, as will be described in greater detail below, the systems and methods disclosed herein may manage deduplicated data using a mark and sweep approach that may eliminate the need for inefficient and complex bilateral referencing systems.

The phrases "deduplicated data" and "data deduplication," as used herein, generally refer to storage systems that eliminate redundant data by storing a single instance of data. As will be described in greater detail below, this single instance of data may be referenced by a single file or a plurality of files in the deduplicated data system. Deduplicated data may also be known as single-instance storage or capacity optimization.

Figure 1:
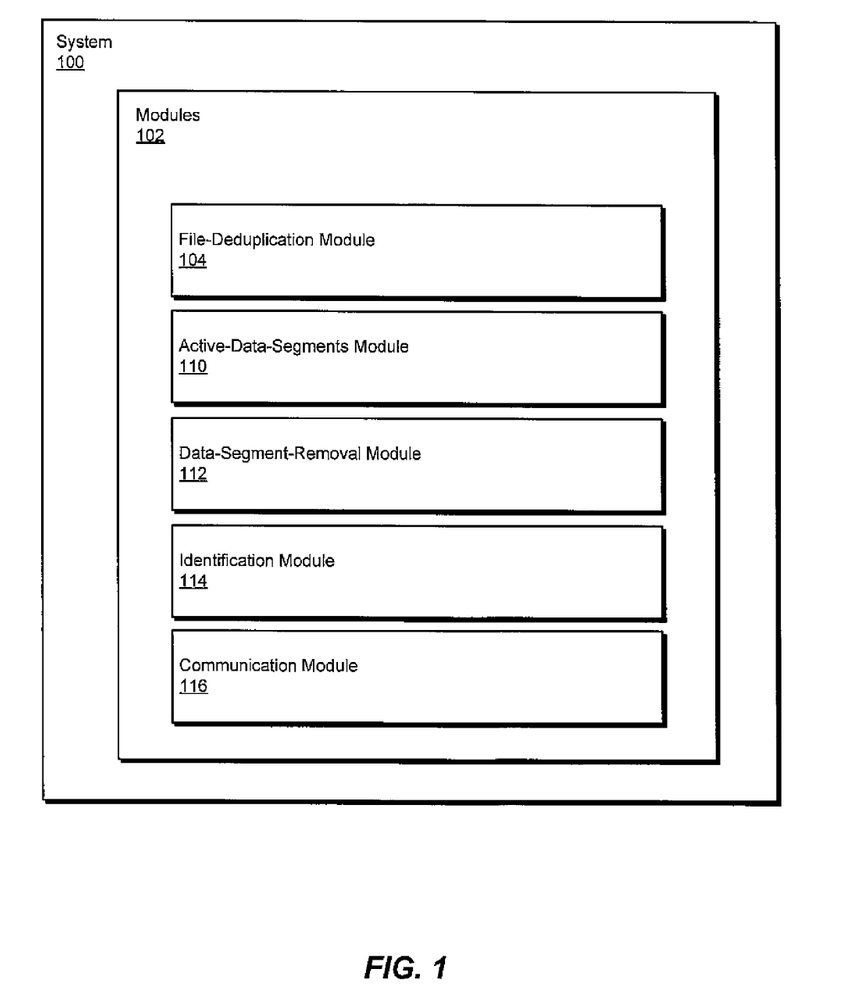
FIG. 1 is a block diagram of an exemplary system for managing deduplicated data using unilateral referencing according to at least one embodiment.
Figure 2:
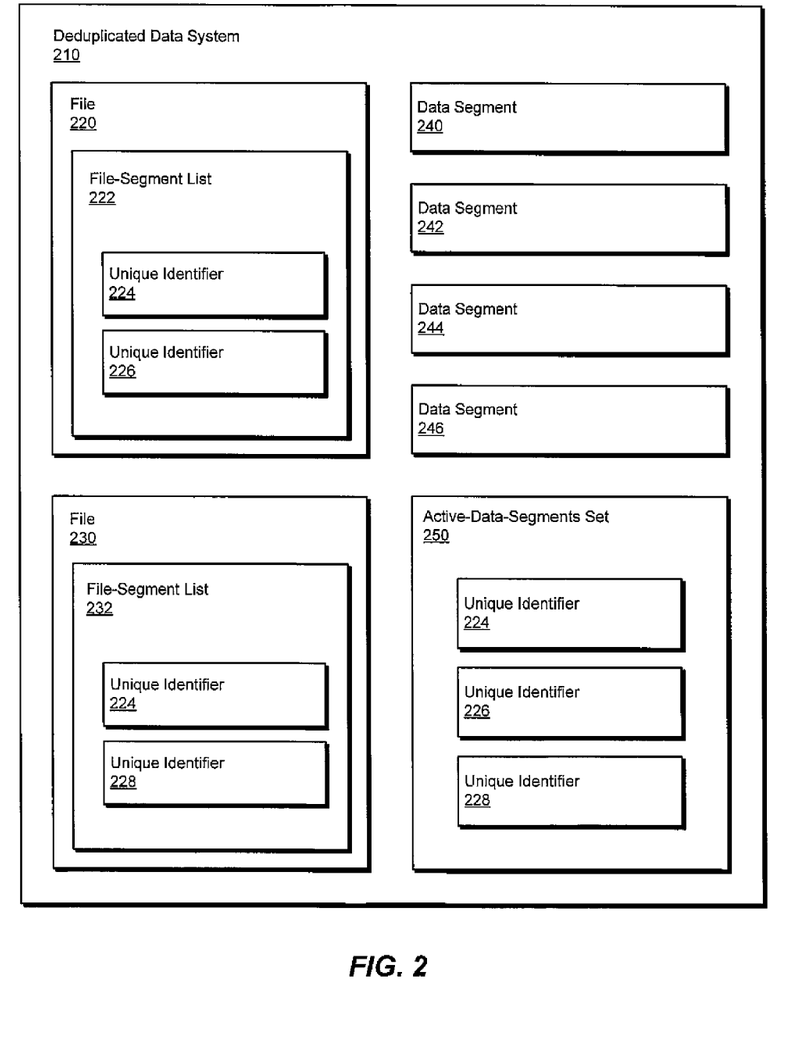
FIG. 2 is a block diagram of an exemplary deduplicated data system according to at least one embodiment.
Figure 4:
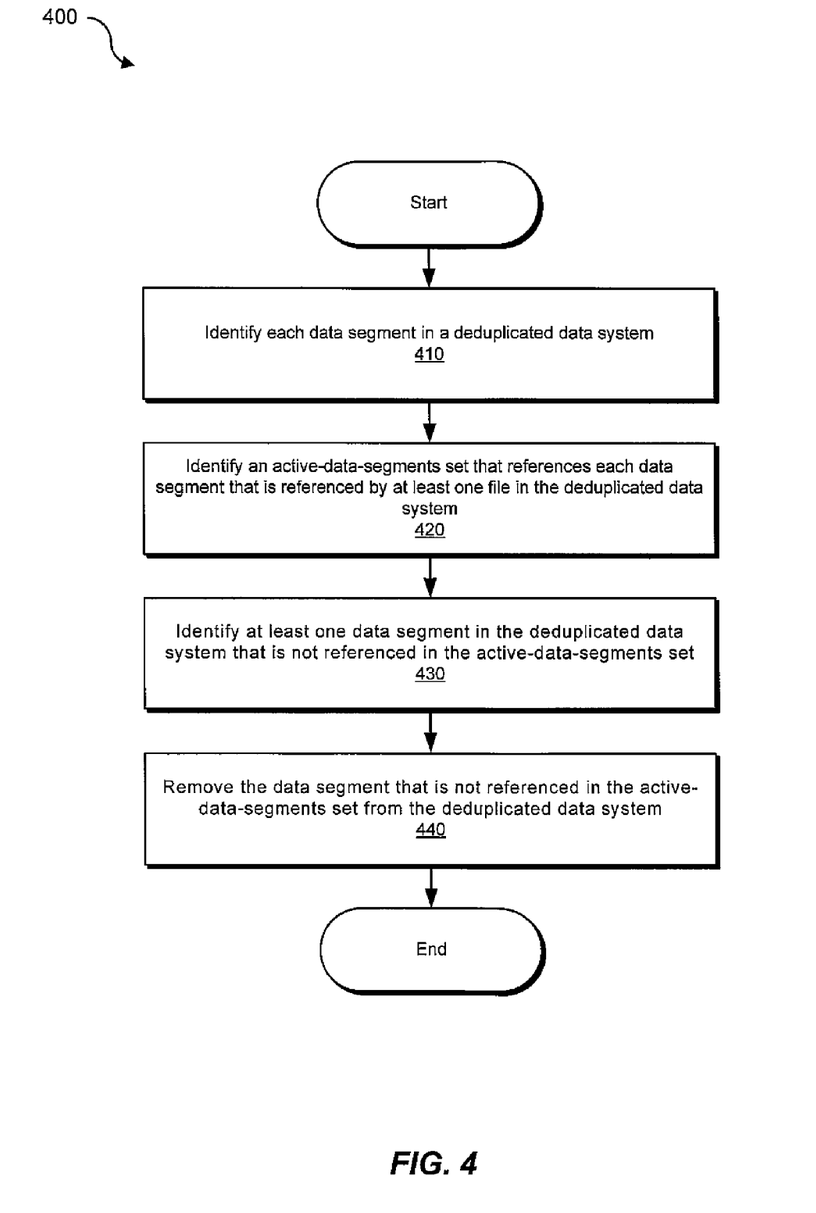
FIG. 4 is a flow diagram of an exemplary computer-implemented method for removing inactive data segments from a deduplicated data system according to at least one embodiment.
Figure 5:
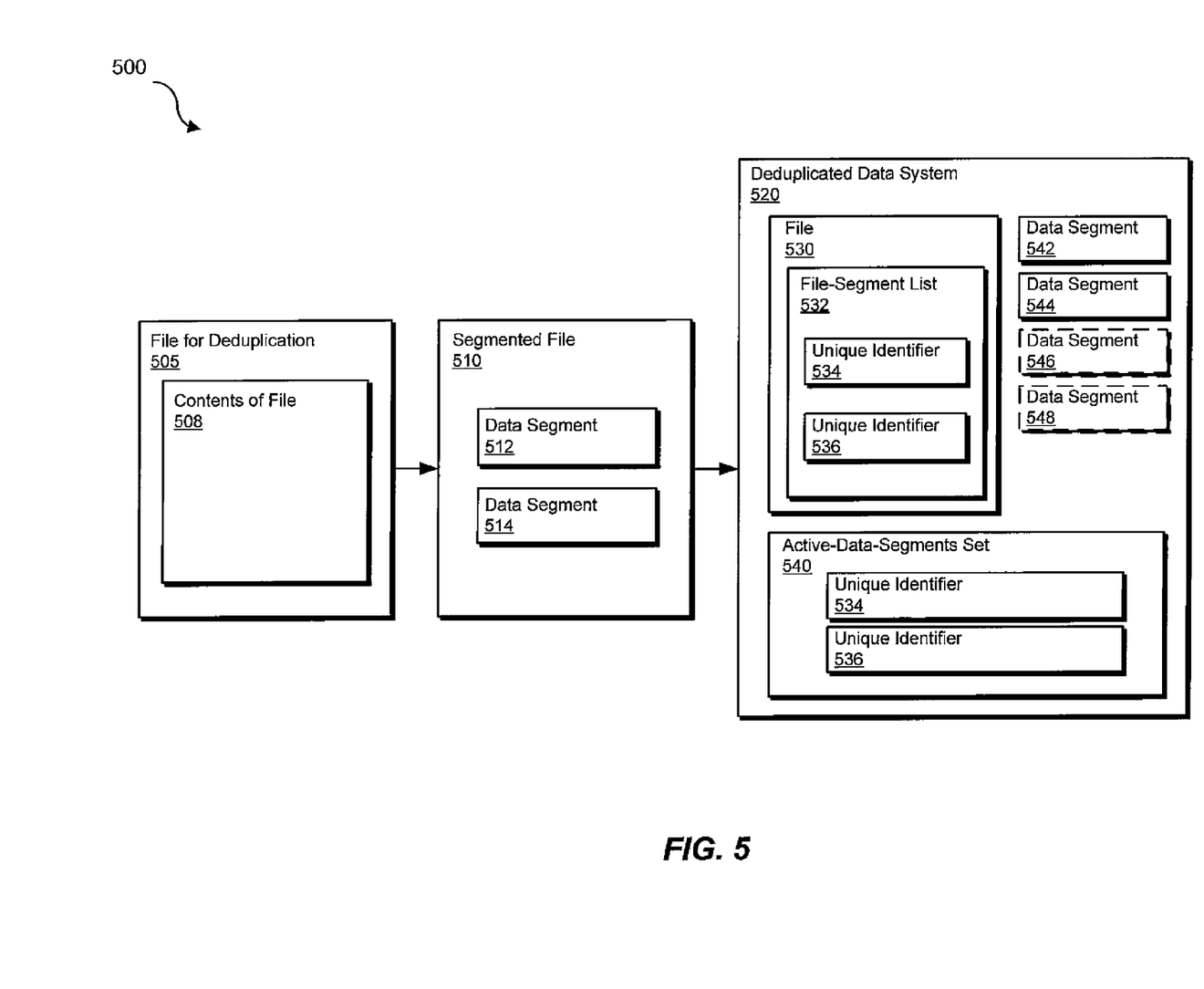
FIG. 5 is a block diagram of an exemplary system for deduplicating data using unilateral referencing according to at least one embodiment.

The following will provide, with reference to FIGS. 1, 2, and 5, detailed descriptions of exemplary systems for managing deduplicated data using unilateral referencing. Descriptions of an exemplary computing system and an exemplary network architecture capable of implementing one or more of the embodiments described and/or illustrated herein will also be provided in connection with FIGS. 7 and 8. Detailed descriptions of corresponding exemplary computer-implemented methods will also be provided in connection with FIGS. 3, 4, and 6.

FIG. 1 is a block diagram of an exemplary system 100 for managing deduplicated data using unilateral referencing. As illustrated in this figure, exemplary system 100 may comprise one or more modules 102 for performing one or more tasks. For example, exemplary system 100 may comprise a file-deduplication module 104 for deduplicating a file, as will be described in greater detail below in connection with FIG. 6. Exemplary system 100 may also comprise an active-data-segments module 110 for creating an active-data-segments set that identifies each data segment that is referenced by at least one file in a deduplicated data system.

In addition, exemplary system 100 may comprise a data-segment-removal module 112 for removing data segments from a deduplicated data system that are not referenced by at least one file in the system (i.e., inactive data segments). Exemplary system 100 may also comprise an identification module 114 for identifying various components of a deduplicated data system and a communication module 116 for facilitating communication between components of a deduplicated data system and/or between a deduplicated data system and other devices.

In certain embodiments, one or more of modules 102 may represent one or more software applications or programs that, when executed by a computing system, may cause the system to perform one or more tasks required to manage deduplicated data. For example, as will be described in greater detail below, one or more of modules 102 may represent software modules configured to run on one or more computing devices, such as deduplicated data system 210 in FIG. 2, exemplary computing system 710 in FIG. 7, and/or portions of exemplary network architecture 800 in FIG. 8. One or more of modules 102 may also represent all or portions of one or more special-purpose computers configured to perform one or more tasks required to manage deduplicated data using unilateral referencing.

FIG. 2 is a block diagram of an exemplary deduplicated data system 210. Deduplicated data system 210 generally represents any type of computing device or network of computing devices capable of deduplicating data. In some embodiments, and as will be explained in greater detail below, deduplicated data system 210 may comprise a distributed system of at least one server and/or at least one client. Examples of deduplicated data systems include, without limitation, file systems, e-mail servers, data backups, storage devices, combinations of one or more of the same, or any other deduplicated data system. In certain embodiments, deduplicated data system 210 may comprise one or more portions of exemplary system 100 in FIG. 1. For example, one or more of modules 102 may be stored and configured to run on deduplicated data system 210 in FIG. 2.

Figure 3:
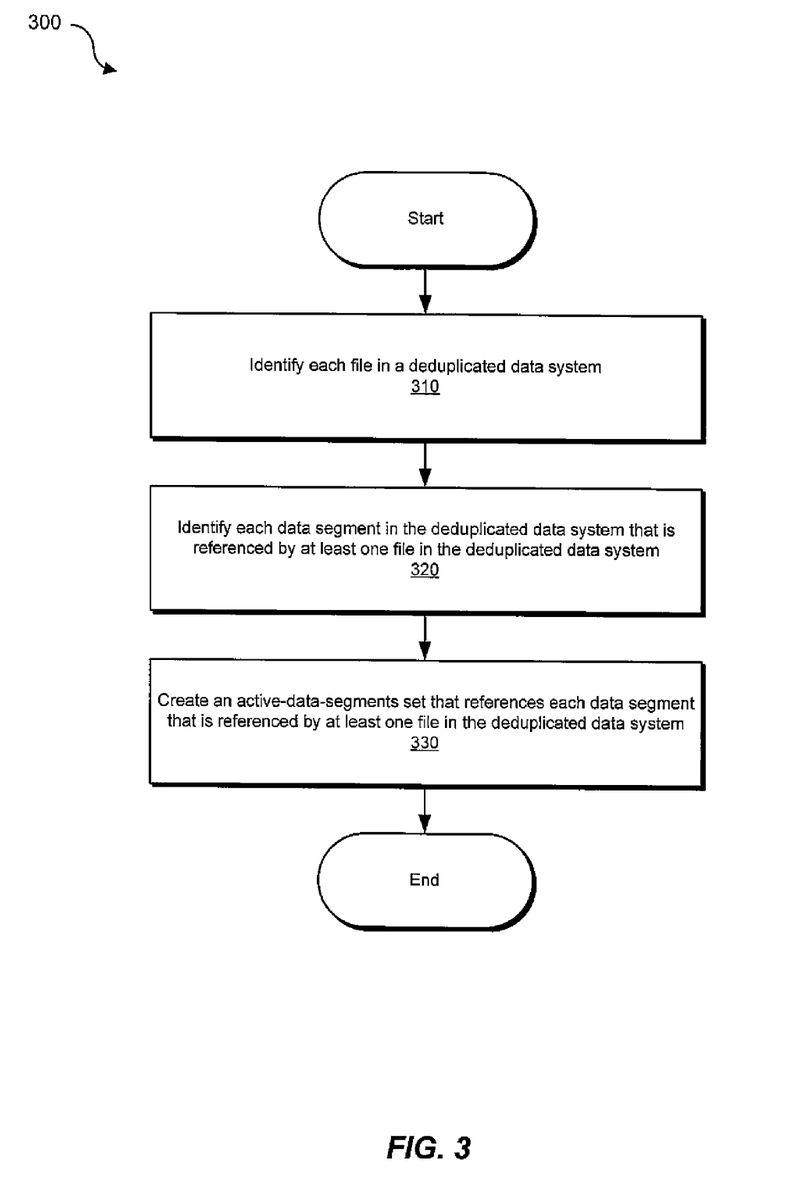
FIG. 3 is a flow diagram of an exemplary computer-implemented method for identifying active data segments in a deduplicated data system according to at least one embodiment.

FIG. 3 is a flow diagram of an exemplary computer-implemented method 300 for identifying active data segments in a deduplicated data system, such as deduplicated data system 210 in FIG. 2. As detailed above, the phrase "active data segment" may refer to a segment of data in a deduplicated data system that is referenced by at least one file in the system.

As illustrated in FIG. 3, at step 310 each file in a deduplicated data system may be identified. For example, active-data-segments module 110 in FIG. 1 may identify each file in deduplicated data system 210 in FIG. 2 (in this case, files 220 and 230).

At step 320, the method may identify each data segment in the deduplicated data system that is referenced by at least one file in the system. Step 320 may be performed in a variety of ways. In one example, active-data-segments module 110 in FIG. 1 may identify each data segment that is referenced by at least one file in the system by: 1) identifying a file-segment list for each file in the deduplicated data system and then 2) identifying each data segment referenced in each file-segment list. For example, active-data-segments module 110 in FIG. 1 may identify file-segment lists 222 and 232 for files 220 and 230, respectively. The phrase "file-segment list," as used herein, may refer to a list that references data segments that make up or compose a file.

In the example illustrated in FIG. 2, file-segment lists 222 and 232 may reference each data segment that makes up or composes files 220 and 230, respectively. For example, if file 220 is composed or made up of data segments 240 and 242, then file-segment list 222 may reference data segments 240 and 242. Similarly, if file 230 is composed or made up of data segments 242 and 244, then file-segment list 232 may reference data segments 242 and 244. However, since neither file 220 or file 230 is composed or made up of data segment 246, then neither file 220 or file 230 may reference data segment 246.

In one example, each file-segment list may contain a unique identifier for each data segment referenced by the file. The phrase "unique identifier" may refer to any identifier that may be used to identify a particular data segment. Examples of unique identifiers include, without limitation, pointers, metadata, hash values, checksums (such as MD5 sums), digital fingerprints, or any other form of identifier.

In the example illustrated in FIG. 2, unique identifier 224 may identify or reference data segment 240, unique identifier 226 may identify or reference data segment 242, and unique identifier 228 may identify or reference data segment 244. In this example, file-segment list 222 may contain unique identifiers 224 and 226 (which identify or reference data segments 240 and 242, respectively) since file 220 is composed or made up of data segments 240 and 242. Similarly, file-segment list 232 may contain unique identifiers 224 and 228 (which identify or reference data segments 240 and 244, respectively) since file 230 is composed or made up of data segments 240 and 244.

Returning to FIG. 3, at step 330 an active-data-segments set may be created. For example, active-data-segments module 110 in FIG. 1 may create active-data-segments set 250 in FIG. 2. In at least one embodiment, active-data-segments set 250 may identify or reference each data segment in deduplicated data system 210 that is referenced by at least one file in deduplicated data system 210. Upon completion of step 330, exemplary computer-implemented method 300 may terminate.

Active-data-segments module 110 in FIG. 1 may create active-data-segments set 250 in FIG. 2 in a variety of ways. In one example, active-data-segments module 110 may create active-data-segments set 250 by adding each data segment in the deduplicated data system that is referenced by at least one file in the deduplicated data system to the active-data-segments set. For example, active-data-segments module 110 may add data segments 240, 242, and 244 to active-data-segments set 250 since each of these data segments is referenced by at least one file in deduplicated data system 210. However, since data segment 246 is not referenced by any file in deduplicated data system 210, then active-data-segments module 110 will not add data segment 246 to active-data-segments set 250.

In an additional example, active-data-segments module 110 may create active-data-segments set 250 by: 1) identifying each unique identifier contained in each file-segment list for each file in deduplicated data system 210 (in this case, unique identifiers 224, 226, and 228 contained within file-segment lists 222 and 232 for files 220 and 230, respectively) and then 2) storing these unique identifiers within active-datasegments set 250. In certain embodiments, active-data-segments set 250 may contain more than one instance of a data segment or a unique identifier associated with a data segment.

If active-data-segments set 250 has already been created, active-data-segments module 110 may update active-data-segments set 250 during subsequent operations by: 1) identifying each unique identifier contained in each file-segment list for each file in deduplicated data system 210, 2) comparing each unique identifier contained in each file-segment list with active-data-segments set 250, 3) determining whether the file-segment lists contain any new unique identifiers that are not contained in active-data-segments list 250, and then 4) adding these new unique identifiers to active-data-segments set 250.

Active-data-segments set 250 in FIG. 2 may identify or reference active data segments (i.e., data segments that are referenced by at least one file in system 210) in a variety of ways. For example, active-data-segments set 250 may represent a list (such as a linked list or a sorted list) of data segments in deduplicated data system 210 that are referenced by at least one file in deduplicated data system 210. In an additional example, active-data-segments set 250 may represent a balanced tree, a bloom filter, and/or any other suitable data structure for identifying or referencing active data segments.

In one or more of these examples, active-data segments set 250 may, in addition to identifying each data segment that is referenced by at least one of the files in deduplicated data system 210, identify additional data segments that are not referenced by at least one file in the deduplicated data system. For example, although not illustrated in FIG. 2, active-data-segments set 250 may comprise a unique identifier that references data segment 246, even though data segment 246 is not referenced by files 220 or 230. Such an approach may result in a more efficient mark phase, at the cost of reducing accuracy of the mark phase.

Similarly, active-data segments set 250 may also identify the same data segment more than once. For example, although not illustrated in FIG. 2, active-data-segments set 250 may comprise two instances of unique identifier 224, wherein both instances of unique identifier 224 reference the same data segment.

Although not illustrated, in certain embodiments method 300 in FIG. 3 may also comprise sorting or organizing the active-data-segments set created in step 330 in order to optimize later operations. For example, active-data-segments module 110 in FIG. 1 may sort the unique identifiers stored in active-data-segments set 250 in a linear order, a sequential order, a logical order, or any other order. In certain embodiments, sorting active-data-segments set 250 in this manner may enable a computing system to more efficiently and quickly access and/or modify active-data-segments set 250 and/or the data segments referenced by active-data-segments set 250.

In addition, although not illustrated in FIG. 3, in certain embodiments exemplary method 300 may also comprise: 1) identifying a new file added to the deduplicated data system prior to completion of a mark phase or cycle, 2) dividing the new file into data segments, and then 3) automatically adding the data segments for the new file to the active-data-segments list. Adding the data segments for the new file to the active-data-segments list in this manner may ensure that data added during the middle of a mark phase will not be prematurely (and erroneously) removed from the deduplicated data system.

In certain embodiments, exemplary method 300 may iterate over less than the entirety of files stored in a deduplicated data system. In this example, exemplary method 300 may comprise: 1) identifying a subset of files in a deduplicated data system that is statistically likely to contain changes, 2) identifying each data segment in the deduplicated data system that is referenced by at least one of the files in the subset of files, and then 3) causing an active-data-segments to identify each data segment in the deduplicated data system that is referenced by at least one of the files in subset of files. Such an approach may result in a more efficient mark phase, at the cost of reducing accuracy of the mark phase.

As detailed above, exemplary method 300 may maintain an active-data-segments set that identifies or references each active data segment in the deduplicated data system (i.e., each data segment that is currently referenced by at least one file in the system). This approach may eliminate the need for conventional bilateral referencing systems in which each data segment in the system maintains a list of each file that references the data segment.

FIG. 4 is a flow diagram of exemplary computer-implemented method 400 for removing inactive data segments from a deduplicated data system (also referred to herein as a sweep phase). As detailed above, an inactive data segment may refer to a segment of data in a deduplicated data system that is not referenced by any of the files in the system.

As illustrated in FIG. 4, at step 410 each data segment in a deduplicated data system may be identified. For example, identification module 114 in FIG. 1 may identify data segments 240, 242, 244, and 246 in deduplicated data system 210 in FIG. 2.

At step 420, an active-data-segments set may be identified. For example, identification module 114 in FIG. 1 may identify active-data-segments set 250 in FIG. 2. As described above, active-data-segments set 250 may identify or reference each active data segment within deduplicated data system 210 (i.e., each data segment in deduplicated data system 210 that is currently referenced by at least one file in system 210). In the example illustrated in FIG. 2, active-data-segments set 250 contains unique identifiers 224, 226, and 228 corresponding to data segments 240, 242, and 244, which indicates that data segments 240, 242, and 244 are currently referenced by at least one file in deduplicated data system 210.

At step 430, at least one data segment that is not identified or referenced in the active-data-segments set may be identified. For example, identification module 114 in FIG. 1 may determine that data segment 246 in FIG. 2 is not identified or referenced by active-data-segments set 250.

Step 430 may be performed in a variety of ways. In one example, data-segment-removal module 112 in FIG. 1 may identify a data segment in deduplicated data system 210 that is not identified or referenced in active-data-segments set 250 by comparing each data segment in deduplicated data system 210 (in this case, data segments 240, 242, 244, and 246) with each data segment or each unique identifier in active-data-segments set 250 (in this case, unique identifiers 224, 226, and 228). In this example, data-segment-removal module 112 may determine, based on such a comparison, that active-data-segments set 250 does not identify or reference data segment 246. In some cases, such a comparison may involve comparing unique identifiers stored as metadata to the data segments with the unique identifiers stored in active-data-segments set 250.

Although not illustrated in FIG. 4, in certain embodiments exemplary method 400 may also comprise: 1) identifying a new file added to the deduplicated data system prior to completion of a sweep phase or cycle, 2) dividing the new file into data segments, 3) marking each of the data segments for the new file as new, and then 4) storing each of the data segments for the new file in the deduplicated data system. Data segments for the new file may be marked in a variety of ways, including through the use of metadata or flags. Marking the data segments for the new file in this manner may ensure that data added during the middle of a sweep phase will not be prematurely (and erroneously) removed from the deduplicated data system.

Figure 6:
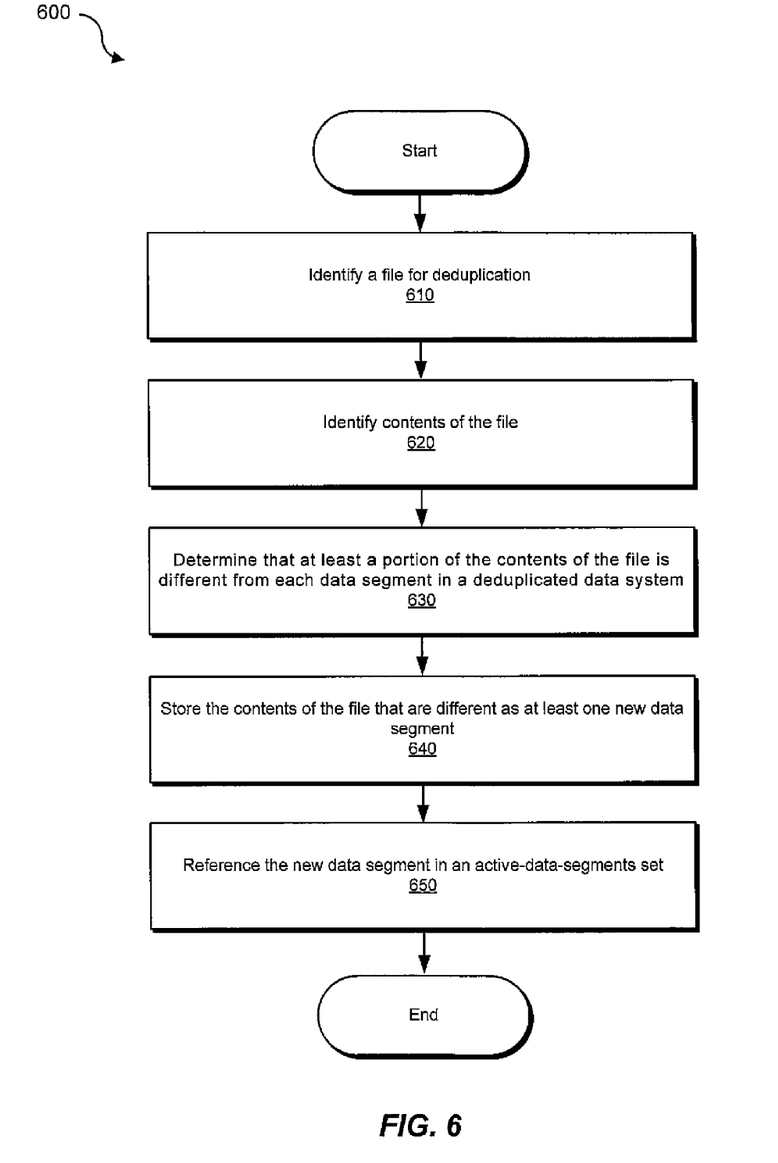
FIG. 6 is a flow diagram of an exemplary computer-implemented method for deduplicating data using unilateral referencing according to at least one embodiment.

FIGS. 5 and 6 are block diagrams of an exemplary system 500 and method 600, respectively, for deduplicating data using unilateral referencing. As illustrated in FIG. 6, at step 610 in method 600 a file for deduplication may be identified. For example, identification module 114 in FIG. 1 may identify a file 505 in FIG. 5 for deduplication.

At step 620, the contents of the file may be identified. For example, file-deduplication module 104 in FIG. 1 may identify the contents 508 of file 505 in FIG. 5. In certain embodiments, the contents of a file may be identified by dividing the file into data segments. For example, file-deduplication module 104 may divide the contents 508 of file 505 into a first data segment 512 and a second data segment 514.

File-deduplication module 104 in FIG. 1 may divide files into data segments in a variety of ways using a variety of heuristics. In one embodiment, file-deduplication module 104 may divide the contents of a file into data segments of a certain size. For example, file-deduplication module 104 may divide the contents 508 of file 505 into data segments of 128 kilobytes. In additional embodiments, file-deduplication module 104 may divide the contents of a file into data segments irrespective of size. For example, file-deduplication module 104 may recognize patterns of data within the contents 508 of file 505 and divide file 505 into data segments that correspond to these data patterns.

In certain embodiments, upon dividing the contents the of file into data segments, file-deduplication module 104 in FIG. 1 may: 1) create a unique identifier for each data segment of the file and then 2) store the unique identifier for each data segment of the file in a file-segment list. For example, as illustrated in FIG. 5, file-deduplication module 104 may create unique identifiers 534 and 536 for data segments 512 and 514, respectively, and store the same in a file-segment list 532. As detailed above, a unique identifier may represent any identifier that may be used to identify a particular data segment. Examples of unique identifiers include, without limitation, pointers, metadata, hash values, checksums (such as MD5 sums), digital fingerprints, or any other form of identifier.

At step 630, the method may determine, by comparing the contents of the file with each data segment in the deduplicated data system, whether at least a portion of the contents of the file is different from each data segment in the deduplicated data system.

Step 630 may be performed in a variety of ways. In one embodiment, step 630 may comprise: 1) comparing each data segment of the file with each data segment in the deduplicated data system and then 2) determining whether at least one data segment of the file is different from each data segment in the deduplicated data system. For example, file-deduplication module 104 in FIG. 1 may determine, by comparing data segments 512 and 514 with each data segment in deduplicated data system 520 (in this case, data segments 542 and 544), that data segments 512 and 514 are different from data segments 542 and 544.

In an additional example, step 630 may comprise: 1) comparing a unique identifier associated with each data segment of the file with each data segment in the deduplicated data system (or with unique identifiers associated with or stored as metadata to each data segment in the deduplicated system) and then 2) determining that at least one data segment of the file is different from each data segment in the deduplicated data system. For example, file-deduplication module 104 may determine, by comparing unique identifiers 534 and 536 with data segments 542 and 544 (or with unique identifiers associated with or stored as metadata to data segments 542 and 544), that the contents of data segments 512 and 514 are not contained in deduplicated data system 520.

At step 640 in FIG. 6, the contents of the file that are different from each of the data segments in the deduplicated data system may be stored as at least one new data segment. In other words, if file-deduplication module 104 determines that at least one data segment of a file is different from each of the data segments in a deduplicated data system, then file-deduplication module 104 may store the data segment as a new data segment in the deduplicated data system. For example, file-deduplication module 104 may store data segments 512 and 514 as new data segments 546 and 548, respectively, after determining that data segments 512 and 514 are different from data segments 542 and 544 in deduplicated data system 520.

At step 650, the new data segment(s) may be referenced in an active-data-segments set. For example, file-deduplication module 104 may cause active-data-segments set 540 to reference new data segments 546 and 548. As detailed above, file-deduplication module 104 may cause active-data-segments set 540 to reference data segments in a variety of ways. In one example, file-deduplication module 104 may store each data segment of file 505 (i.e., data segments 512 and 514) in active-data-segments set 540. In an additional example, active-data-segments set 540 may contain unique identifiers for each active data segment in deduplicated data system 520. For example, file-deduplication module 104 may store unique identifiers 534 and 536 corresponding to new data segments 546 and 548 in active-data-segments set 540.

As detailed above, active-data-segments set 540 may represent a list (such as a linked list or a sorted list) of data segments in deduplicated data system 520 that are referenced by at least one file in deduplicated data system 520. Active-data-segments set 540 may also represent a balanced tree, a bloom filter, and/or any other suitable data structure for identifying or referencing active data segments. Upon completion of step 650 in FIG. 6, exemplary method 600 may terminate.

The various systems and methods described herein may provide a number of advantages over conventional deduplicated data systems. For example, because these systems and methods maintain an active-data-segments set that identifies or references each active data segment in the deduplicated data system (i.e., each data segment that is currently referenced by at least one file in the system), this may eliminate the need for each data segment in the system to maintain a list of each file that references the data segment (for referential integrity purposes). Moreover, since (as detailed above) the active-data-segments set may be sorted in order to optimize later operations, the systems and methods described herein may result in increased disk-access performance. In addition, the exemplary methods described herein may be performed periodically or when sufficient deletion operations have occurred to warrant data management or cleanup.

Figure 7:
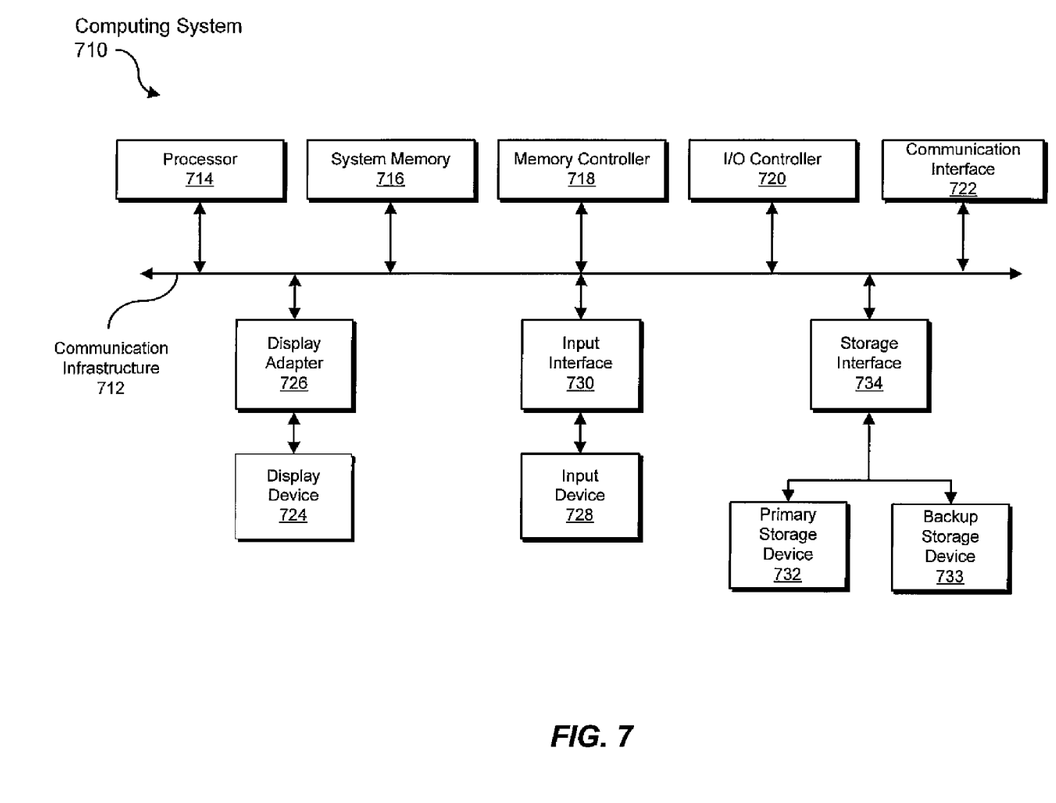
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, creating, containing, comparing, storing, determining, sorting, removing, deleting, reallocating, referencing, dividing, and marking steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, creating, containing, comparing, storing, determining, sorting, removing, deleting, reallocating, referencing, dividing, and/or marking.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, creating, containing, comparing, storing, determining, sorting, removing, deleting, reallocating, referencing, dividing, and marking steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, creating, containing, comparing, storing, determining, sorting, removing, deleting, reallocating, referencing, dividing, and marking steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, creating, containing, comparing, storing, determining, sorting, removing, deleting, reallocating, referencing, dividing, and marking steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, creating, containing, comparing, storing, determining, sorting, removing, deleting, reallocating, referencing, dividing, and marking steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
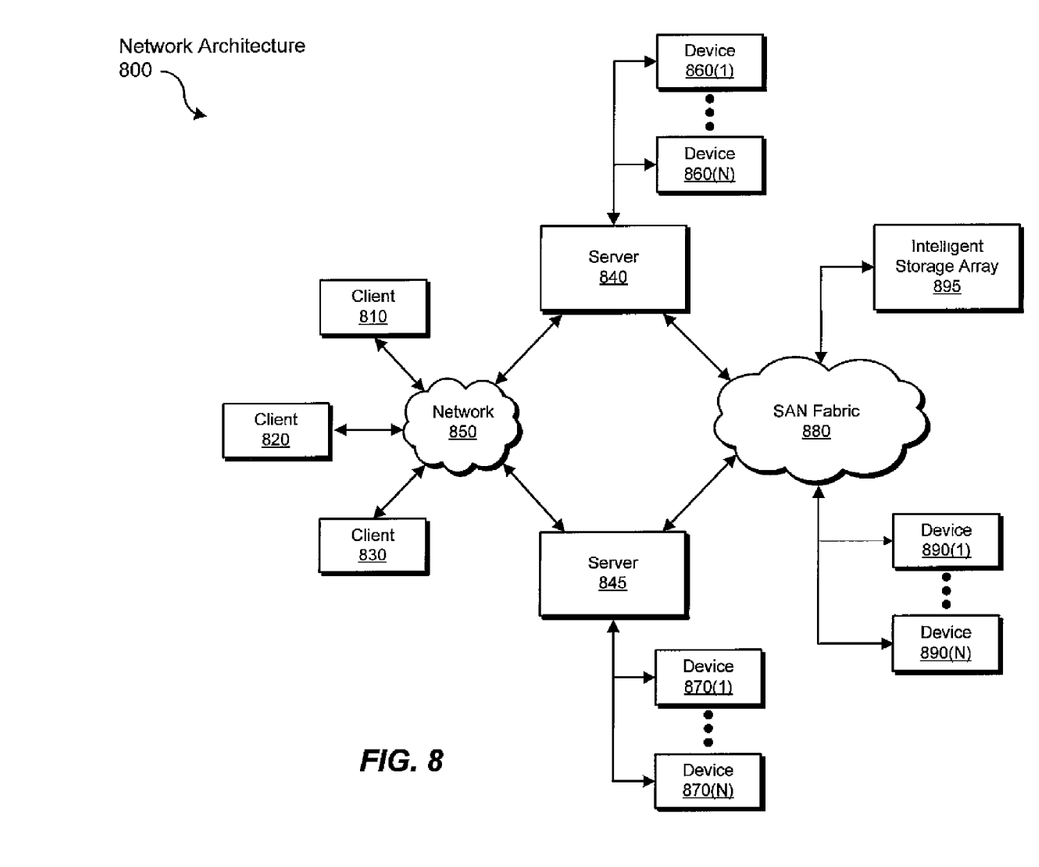
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, creating, containing, comparing, storing, determining, sorting, removing, deleting, reallocating, referencing, dividing, and marking steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, a method for identifying active data segments in a deduplicated data system may comprise: 1) identifying each file in the deduplicated data system, 2) identifying each data segment in the deduplicated data system that is referenced by at least one file in the deduplicated data system, and 3) creating an active-data-segments set that identifies each data segment in the deduplicated data system that is referenced by at least one file in the deduplicated data system.

Identifying each data segment in the deduplicated data system that is referenced by at least one file in the deduplicated data system may comprise: 1) identifying a file-segment list for each file in the deduplicated data system, each file-segment list identifying data segments referenced by a single file and 2) identifying each data segment referenced in each file-segment list for each file in the deduplicated data system.

In addition, each file-segment list may contain a unique identifier for each data segment referenced in the file-segment list. This unique identifier may comprise metadata that identifies a data segment and/or a pointer to a data segment.

In some examples, creating the active-data-segments set may comprise adding each data segment in the deduplicated data system that is referenced by at least one file in the deduplicated data system to the active-data-segments set. In additional examples, wherein creating the active-data-segments set may comprise: 1) identifying each unique identifier contained in each file-segment list for each file in the deduplicated data system, 2) comparing each unique identifier contained in each file-segment list with the active-data-segments set, 3) determining whether each file-segment list contains any unique identifiers that are not contained in the active-data-segments list, and 4) adding any unique identifiers that are not contained in the active-data-segments set to the active-data-segments set.

The active-data-segments set may represent a linked list that references each data segment in the deduplicated data system that is referenced by at least one file in the deduplicated data system, a sorted linked list that references each data segment in the deduplicated data system that is referenced by at least one file in the deduplicated data system, a balanced tree that identifies each data segment in the deduplicated data system that is referenced by at least one file in the deduplicated data system, a bloom filter that identifies at least each data segment in the deduplicated data system that is referenced by at least one file in the deduplicated data system, and/or any other suitable data structure. In one or more of these examples, the active-data segments set may, in addition to identifying each data segment that is referenced by at least one of the files in the system, identify additional data segments that are not referenced by at least one file in the deduplicated data system. The active-data segments set may also identify the same data segment more than once.

In some examples, the method may further comprise: 1) identifying a new file added to the deduplicated data system prior to completion of a cycle for identifying active data segments, 2) dividing the new file into data segments, and 3) automatically adding the data segments for the new file to the active-data-segments list. The method may also further comprise sorting the active-data-segments set. In addition, the method may further comprise: 1) identifying a subset of files in the deduplicated data system that is statistically likely to contain changes, 2) identifying each data segment in the deduplicated data system that is referenced by at least one of the files in the subset of files, and then 3) causing the active-data-segments to identify each data segment in the deduplicated data system that is referenced by at least one of the files in subset of files.

In an additional embodiment, a method for removing inactive data segments from a deduplicated data system may comprise: 1) identifying each data segment in the deduplicated data system, 2) identifying an active-data-segments set that identifies each data segment in the deduplicated data system that is referenced by at least one file in the deduplicated data system, 3) identifying at least one data segment in the deduplicated data system that is not identified in the active-data-segments set, and then 4) removing, from the deduplicated data system, the data segment that is not identified in the active-data-segments set.

In some embodiments, the active-data-segments set may contain each data segment in the deduplicated data system that is referenced by at least one file in the deduplicated data system. In addition, identifying the at least one data segment in the deduplicated data system that is not identified in the active-data-segments set may comprise identifying, by comparing each data segment in the deduplicated data system with each data segment in the active-data-segments set, at least one data segment in the deduplicated data system that is not in the active-data-segments set.

In certain examples, the active-data-segments set may contain a unique identifier for each data segment in the deduplicated data system that is referenced by at least one file in the deduplicated data system. In this example, identifying the at least one data segment in the deduplicated data system that is not identified in the active-data-segments set may comprise: 1) identifying unique identifiers for each data segment in the deduplicated data system and 2) identifying, by comparing the unique identifiers for each data segment in the deduplicated data system with the unique identifiers in the active-data-segments set, at least one unique identifier for a data segment in the deduplicated data system that is not identified in the active-data-segments set.

Removing the data segment that is not identified in the active-data-segments set may comprise deleting the data segment and/or reallocating a memory location of the data segment for use by another data segment. The method may also comprise: 1) identifying a new file added to the deduplicated data system prior to completion of a cycle for removing inactive data segments, 2) dividing the new file into data segments, 3) marking each of the data segments for the new file as new, and 4) storing each of the data segments for the new file in the deduplicated data system.

A method for deduplicating data by unilaterally referencing data segments may comprise: 1) identifying a file for deduplication, 2) identifying contents of the file, 3) determining, by comparing the contents of the file with each data segment in a deduplicated data system, that at least a portion of the contents of the file is different from each data segment in the deduplicated data system, 4) storing, as at least one new data segment, the contents of the file that are different from each data segment in the deduplicated data system, and then 5) referencing the new data segment in an active-data-segments set.

In one example, identifying the contents of the file may comprise dividing the contents of the file into data segments. In addition, determining that at least a portion of the contents of the file is different from each data segment in the deduplicated data system may comprise: 1) comparing each data segment of the file with each data segment in the deduplicated data system and 2) determining that at least one data segment of the file is different from each data segment in the deduplicated data system.

In certain examples, the method may also comprise: 1) creating a unique identifier for each data segment of the file and 2) storing the unique identifier for each data segment of the file in a file-segment list associated with the file. In addition, referencing the new data segment in the active-data-segments set may comprise storing each data segment of the file in the active-data-segments set or storing the unique identifier for each data segment of the file in the active-data-segments set. In one example, none of the data segments in the deduplicated data system may reference any of the files in the deduplicated data system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for identifying active data segments in a deduplicated data system, the method comprising:
    on a periodic basis, entering a unitary mark phase for marking referenced data segments within the deduplicated data system, the unitary mark phase comprising:
        identifying each file in the deduplicated data system;
        identifying each data segment in the deduplicated data system that is referenced by at least one file in the deduplicated data system;
        creating an active-data-segments set that identifies each data segment in the deduplicated data system that is referenced by at least one file in the deduplicated data system;
    entering an additional unitary mark phase for marking referenced data segments within the deduplicated data system, the additional unitary mark phase comprising:
        identifying a subset of files in the deduplicated data system that is statistically likely to contain changes within the deduplicated data system;
        identifying each data segment in the deduplicated data system that is referenced by at least one file in the subset of files;
        causing the active-data-segments set to identify each data segment in the deduplicated data system that is referenced by at least one file in subset of files.

2. The method of claim 1, wherein creating the active-data-segments set comprises adding each data segment in the deduplicated data system that is referenced by at least one file in the deduplicated data system to the active-data-segments set.

3. The method of claim 1, wherein identifying each data segment in the deduplicated data system that is referenced by at least one file in the deduplicated data system comprises:
    identifying a file-segment list for each file in the deduplicated data system, each file-segment list identifying data segments referenced by a single file;
    identifying each data segment referenced in each file-segment list for each file in the deduplicated data system.

4. The method of claim 1, wherein each file-segment list contains a unique identifier for each data segment referenced in the file-segment list, the unique identifier comprising:
    metadata that identifies a data segment;
    a pointer to a data segment.

5. The method of claim 4, wherein creating the active-data-segments set comprises:

identifying each unique identifier contained in each file-segment list for each file in the deduplicated data system;
comparing each unique identifier contained in each file-segment list with the active-data-segments set;
determining whether each file-segment list contains any unique identifiers that are not contained in the active-data-segments set;
adding any unique identifiers that are not contained in the active-data-segments set to the active-data-segments set.

6. The method of claim 1, wherein creating the active-data-segments set comprises at least one of:
creating a linked list that references each data segment in the deduplicated data system that is referenced by at least one file in the deduplicated data system;
creating a sorted linked list that references each data segment in the deduplicated data system that is referenced by at least one file in the deduplicated data system;
creating a balanced tree that identifies each data segment in the deduplicated data system that is referenced by at least one file in the deduplicated data system;
creating a bloom filter that identifies at least each data segment in the deduplicated data system that is referenced by at least one file in the deduplicated data system.

7. The method of claim 1, wherein the active-data-segments set:
identifies the same data segment more than once;
identifies at least one data segment that is not referenced by at least one file in the deduplicated data system.

8. The method of claim 1, further comprising:
identifying a new file added to the deduplicated data system prior to completion of a cycle for identifying active data segments;
dividing the new file into data segments;
automatically adding the data segments for the new file to the active-data-segments list.

9. The method of claim 1, wherein the unitary mark phase further comprises sorting the active-data-segments set.

10. A method for removing inactive data segments from a deduplicated data system, the method comprising:
on a periodic basis, entering a unitary sweep phase for removing unreferenced data segments within the deduplicated data system, the unitary sweep phase comprising:
identifying each data segment in the deduplicated data system;
identifying an active-data-segments set that identifies each data segment in the deduplicated data system that is referenced by at least one file in the deduplicated data system, the active-data-segments set generated at least in part during:
a unitary mark phase for marking referenced data segments within the deduplicated data system in which each data segment within the deduplicated data system that is referenced by at least one file in the deduplicated data system is marked as referenced; and
an additional unitary mark phase in which each data segment within the deduplicated data system that is referenced by at least one file within a subset of files identified as statistically likely to contain changes is marked as referenced;
identifying at least one data segment in the deduplicated data system that is not identified in the active-data-segments set;
removing, from the deduplicated data system, the at least one data segment that is not identified in the active-data-segments set.

11. The method of claim 10, wherein:
the active-data-segments set contains each data segment in the deduplicated data system that is referenced by at least one file in the deduplicated data system;
identifying the at least one data segment in the deduplicated data system that is not identified in the active-data-segments set comprises identifying, by comparing each data segment in the deduplicated data system with each data segment in the active-data-segments set, at least one data segment in the deduplicated data system that is not in the active-data-segments set.

12. The method of claim 10, wherein:
the active-data-segments set contains a unique identifier for each data segment in the deduplicated data system that is referenced by at least one file in the deduplicated data system, the unique identifier comprising:
metadata that identifies a data segment;
a pointer to a data segment;
identifying the at least one data segment in the deduplicated data system that is not identified in the active-data-segments set comprises:
identifying unique identifiers for each data segment in the deduplicated data system;
identifying, by comparing the unique identifiers for each data segment in the deduplicated data system with the unique identifiers in the active-data-segments set, at least one unique identifier for a data segment in the deduplicated data system that is not identified in the active-data-segments set.

13. The method of claim 10, further comprising:
identifying a new file added to the deduplicated data system prior to completion of a cycle for removing inactive data segments;
dividing the new file into data segments;
marking each of the data segments for the new file as new;
storing each of the data segments for the new file in the deduplicated data system.

* * * * *